United States Patent [19]

Takahashi et al.

[11] Patent Number: 4,529,903

[45] Date of Patent: Jul. 16, 1985

[54] PULSE GENERATORS COMBINED WITH MICROMOTORS

[75] Inventors: Akira Takahashi; Shinju Kasahara, both of Gyoda; Toshiaki Hosokawa, Kuki, all of Japan

[73] Assignee: Jeco Co., Ltd., Kanagawa, Japan

[21] Appl. No.: 636,185

[22] Filed: Jul. 31, 1984

[30] Foreign Application Priority Data

Sep. 23, 1983 [JP] Japan .............. 58-147485[U]

[51] Int. Cl.³ ........................................... H02K 21/12
[52] U.S. Cl. .................................................. 310/156
[58] Field of Search .............. 310/156, 68 R, 40 MM, 310/268, DIG. 3, DIG. 6, 264, 265, 166, 168, 171, 113

[56] References Cited

U.S. PATENT DOCUMENTS

| | | | |
|---|---|---|---|
| 2,985,778 | 5/1961 | Fritz | 310/156 X |
| 3,473,061 | 10/1969 | Soehner et al. | 310/156 |
| 3,551,711 | 12/1970 | Davis | 310/156 |
| 3,786,336 | 1/1974 | Lohr | 310/156 X |
| 3,796,899 | 3/1974 | Giachello | 310/156 |
| 3,931,535 | 1/1976 | Roesel | 310/113 |
| 4,093,897 | 6/1978 | Fujita et al. | 310/268 X |
| 4,237,394 | 12/1980 | Aoki | 310/268 X |
| 4,437,061 | 3/1984 | Shinozaki | 310/156 X |
| 4,455,516 | 6/1984 | Furusho | 310/156 X |

*Primary Examiner*—Mark O. Budd
*Attorney, Agent, or Firm*—Townsend & Townsend

[57] ABSTRACT

A pulse generator combined with a micromotor is constructed by a disc shaped rotary magnet secured to the shaft of the motor and magnetized in the axial director, a rotary yoke made of magnetic material and provided with a plurality of equally spaced magnetic pole teeth extending in the axial direction, a magnetic stationary yoke secured to the casing of the micromotor and disposed to oppose the magnetic pole teeth of the rotary yoke, and a printed board interposed between the stationary yoke and the rotary yoke and secured to the motor casing. The printed board is formed with a wavy continuous electroconductive pattern on a circle facing the magnetic pole teeth so as to induce electric pulse signal by the flux produced by the magnetic pole teeth. The printed board is also formed with output terminals and source terminals connecting the micromotor to an electric source.

7 Claims, 6 Drawing Figures

4,529,903

PULSE GENERATORS COMBINED WITH MICROMOTORS

BACKGROUND OF THE INVENTION

This invention relates to a pulse generator combined with a micromotor, that is an electric motor having very small size and capacity.

A pulse generator combined with a micromotor is used to produce a pulse corresponding to the number of revolutions of the micromotor and supplied to various control circuits. Typical construction of such combination is shown in FIGS. 1 and 2. In these figures, the micromotor comprises a rotor 1 secured to a rotary shaft 2, a commutator 4, brushes 5, a metal casing 6, and an end cover 7 made of synthetic resin.

As shown in FIGS. 1 and 2, the conventional pulse generator comprises a rotary magnet 8 secured to the shaft 2 of the micromotor and having a plurality of magnetized poles about the periphery, a stator coil 9 surrounding the rotary magnet 8, and a pair of stator yokes 10 and 11 respectively having magnetic teeth 10a and 11a which are arranged alternately along the inner peripheral surface of the stator coil 9.

The pulse generator is desired to increase the number of magnetic poles of the rotary magnet 8 in order to increase the detection frequency. As it is necessary to maintain a definite pole pitch spacing, in order to form a plurality of poles, it is necessary to increase the outer diameter of the rotary magnet 8. Furthermore, since the width of the magnetic poles is limited by machining and dimensional accuracy, it is also impossible to make small the stator yokes 10 and 11, whereby overall size of the pulse generator increases. Usually, the stator yokes 10 and 11 are prepared by working magnetic plates, and particularly since their magnetic teeth 10a and 11a are formed by stamping and bending there is a problem of accuracy due to nonuniform bending or inclination of the magnetic teeth.

SUMMARY OF THE INVENTION

It is, therefore, an object of this invention to provide a novel pulse generator combined with a micromotor capable of miniaturizing its size and simplifying its construction.

Another object of this invention is to provide an improved pulse generator combined with a micromotor capable of uniformly machining.

Still another object of this invention is to provide a pulse generator combined with a micromotor capable of manufacturing at a low cost.

According to this invention, these and further objects can be accomplished by providing a pulse generator combined with a micromotor comprising a cylindrical rotary magnet secured to the rotary shaft of the micromotor and magnetized in the axial direction, a rotary yoke made of magnetic material and disposed closely adjacent to the rotary magnet, the rotary yoke having a plurality of magnetic pole teeth equally spaced in the circumferential direction and extending in parallel with the rotary shaft, a stationary yoke made of magnetic material and secured to a casing of the micromotor, the stationary yoke being disposed to oppose the magnetic pole teeth of the rotary yoke with a spacing between the magnetic pole teeth and the stationary yoke, and a printed board interposed between the stationary yoke and the rotary yoke and secured to the casing of the micromotor. The printed board is spaced from the rotary yoke and provided with a continuous wavy electrconductive pattern on one surface of the printed board opposing the magnetic pole teeth of the rotary yoke, and means for deriving out from the opposite ends of the electroconductive pattern a pulse signal induced therein by magnetic flux produced by the magnetic pole teeth.

DESCRIPTION OF THE PREFERRED EMBODIMENTS

Figure 1:
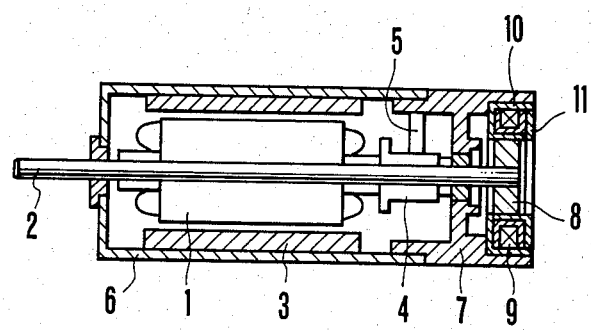
FIG. 1 is a longitudinal sectional view showing one example of a prior art pulse generator combined with a micromotor.
Figure 2:
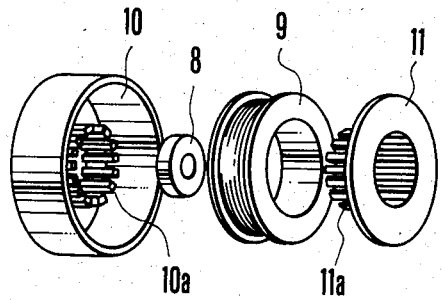
FIG. 2 is an exploded perspective view showing the pulse generator shown in FIG. 1.
Figure 3:
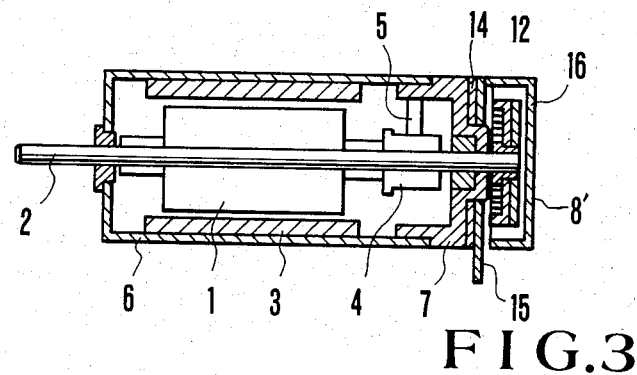
FIG. 3 is a longitudinal sectional view showing one embodiment of a pulse generator according to this invention and with a micromotor.
Figure 4:
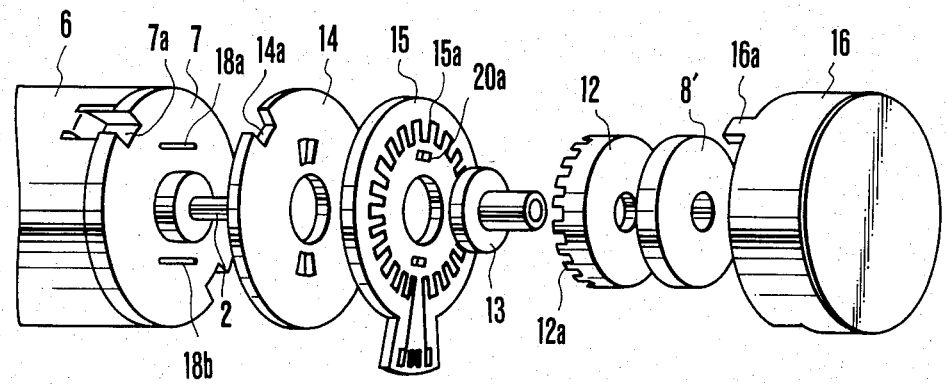
FIG. 4 is an exploded perspective view of the pulse generator in FIG. 3.

A preferred embodiment of this invention will now be described with reference to FIGS. 3, 4 and 5 in which parts corresponding to those shown in FIGS. 1 and 2 are designated by the same reference charactors. Since the micromotor 6 has the same construction as that shown in FIG. 1, only the pulse generator will be described It comprises a plate shaped rotary magnet 8' fixed to the rotary shaft 2 through a bushing 13 and magnetized in the axial direction to have N and S poles on the opposite sides. The bottom plate of a cylindrical yoke 12 made of magnetic material is fitted to one side surface of the rotary magnet 8'. A plurality of equally spaced magnetic teeth 12a extending in the axial direction are formed around the left hand periphery of the yoke 12 as viewed in FIG. 4. The pulse generator also comprises a stationary yoke 14 made of magnetic material and suitably secured to the resin casing 7, and a printed board 15 formed with a continuous wavy or rectangular electroconductive pattern 15a and disposed between the stationary yoke 14 and the rotary yoke 12. The printed board 15 may be secured to the resin casing 7 with no or a small gap with respect to the stationary yoke 14. A cup shaped outer yoke 16 made of magnetic material is provided to surround the rotary magnet 8' and the rotary yoke 12 to act as a protective cover. The outer yoke 16 is formed with projections 16a (only one is shown) which are received in the notches 14a at the periphery of the yoke 14 and the notches 7a of the resin casing 7 to securely hold the outer yoke 16.

Figure 5:
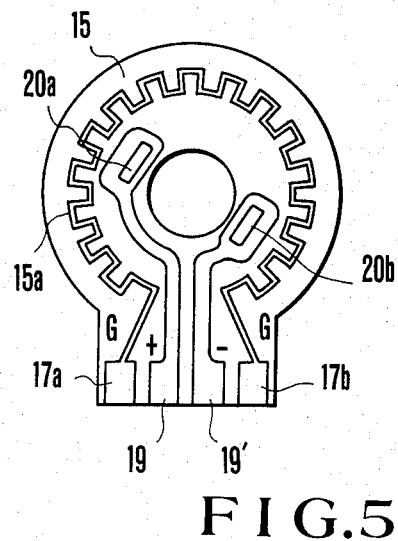
FIG. 5 is a front view of a printed board utilized in FIGS. 3 and 4.

As shown in FIG. 5, the printed board 15 is formed with output terminals 17a and 17b connected to the electroconductive pattern 15a, source terminals 19a and 19b connected to motor terminals 18a and 18b (see FIG. 4) and terminal openings 20a and 20b adapted to receive motor terminals 18a and 18b.

With the construction described above, the magnetic flux produced by the axially magnetized rotary magnet 8' passes through a magnetic circuit including the pole teeth 12a of the rotary yoke 12, the printed board 15 formed with the electroconductive pattern 15a, the stationary yoke 14 and the outer yoke 16.

The pulse generator operates as follows:

When the motor terminals 18a and 18b are connected to a source, not shown, via source terminals 19 and 19b the rotor 1 of the motor begins to rotate. Then the rotary magnet 8' is rotated together with the rotary yoke 12 so that the magnetic pole teeth 12a of the rotary yoke 12 pass by the continuous electroconductive pattern 15a on the printed board 15 to induce therein alternating current voltage (having a waveform close to a sine wave). This voltage is sent to a speed regulating circuit (not shown), for example, through output terminals 17a and 17b as a detected pulse.

A modified emodiment of this invention will now be described with reference to FIG. 6 in which parts corresponding to those shown in FIGS. 1, 3, 4 and 5 are designated by the same reference numerals.

Although in the first embodiment, the rotary magnet 8' was disposed to the outside (or to the right) of the rotary yoke 12 so that it was possible to make large the magnet 8' so as to produce a large output, due to the construction of the magnetic circuit it was necessary to provide outer yoke 16.

Figure 6:
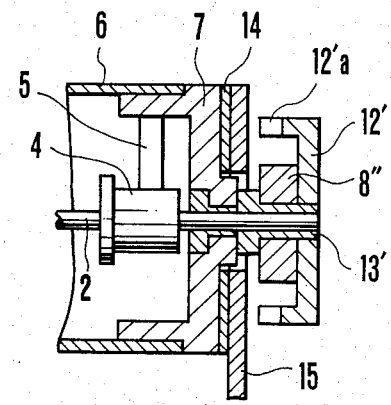
FIG. 6 is a partial sectional view showing another embodiment of this invention.

In the modification shown in FIG. 6 since the rotary magnet 8" is located on the inside (or to the left) of the rotary yoke 12', it is possible to construct the magnetic circuit without porividing the outer yoke 16.

For completing the magnetic circuit, it is advantageous to make bushing 13' adapted to secure the rotary magnet 8" of magnetic material. In addition, according to this modification, since the rotary magnet 8" is located inside of the axially projecting magnetic pole teeth 12'a of the rotary yoke 12', it is not necessary to provide an outer yoke, thus making smaller the pulse generator than that of the first embodiment.

As above described, according to the pulse generator embodying the invention since the rotary magnets 8 and 8" are disc-shaped and magnetized in the axial direction, magnetization of the magnets are easier than the prior art construction in which the outer periphery is magnetized. Moreover, it is possible to decrease the size of the pulse generator. Moreover, the minimum width of the magnetic pole teeth 12a and 12 axially projecting at equal spacing from the end of the rotary yokes 12 and 12' is not limited by machining. This construction not only prevents bending of the teeth caused by the machining accuracy but also makes it possible to increase the number of poles, thus increasing the frequency of the output pulse. As it is possible to provide output terminals 17a and 17b of the pulse generator and the source terminals 19a and 19b for the motor on the printed board 15, assembling of the component parts is facilitated. Thus, this invention provides an improved pulse generator having a small size and can produce high frequency pulse.

The pulse generator of this invention can be used as a speed generator capable of producing a pulse having a frequency proportional to the speed and for various other applications.

It should be understood that the invention is not limited to the specific embodiments described above and that various changes and modifications will be obvious to one skilled in the art. For example, the configuration of the magnetic teeth is not limited to rectangular but may be triangular or arcuate. In the same manner, the configuration of the electroconductive pattern is not limited to rectangular but may take any configuration so long as the pattern can produce a pulse voltage in response to variation in the magnetic flux.

What is claimed is:

1. A pulse generator combined with a micromotor comprising:
    a cylindrical rotary magnet secured to a rotary shaft of the micromotor and magnetized in the axial direction;
    a rotary yoke made of magnetic material and disposed closely adjacent said rotary magnet, said rotary yoke having a plurality of magnetic pole teeth equally spaced in the circumferential direction and extending in parallel with said rotary shaft;
    a stationary yoke made of magnetic material and secured to a casing of said micromotor, said stationary yoke being disposed to oppose said magnetic pole teeth of said rotary yoke with a spacing between said magnetic pole teeth and said stationary yoke; and
    a printed board interposed between said stationary yoke and said rotary yoke and secured to the casing of said micromotor,
    said printed board being spaced from said rotary yoke and provided with a continuous wavy electroconductive pattern on one surface of the printed board opposing said magnetic pole teeth of said rotary yoke, and means for deriving out from opposite ends of said electroconductive pattern a pulse signal induced therein by magnetic flux produced by said magnetic pole teeth.

2. The pulse generator as defined in claim 1 wherein said printed board is in direct contact with said stationary yoke.

3. The pulse generator as defined in claim 1 wherein said plurality of magnetic pole teeth are formed on a side of said cylindrical rotary yoke facing said stationary yoke.

4. The pulse generator as defined in claim 1 wherein said rotary yoke has a shape of a bottomed cylinder, the bottom thereof being disposed in direct contact with one side of said rotary magnet facing said stationary yoke.

5. The pulse generator as defined in claim 1 wherein said rotary yoke takes the form of a bottomed cylinder and disposed to surround said rotary magnet.

6. The pulse generator as defined in claim 1 which further comprises a cup shaped magnetic protective cover surrounding said rotary magnet and said rotary yoke, and means for securing said protective cover to the casing of said micromotor.

7. The pulse generator as defined in claim 1 wherein said wavy electroconductive pattern comprises a plurality of rectangles, triangles or arcs which are connected in series in a peripheral direction of said printed board.

* * * * *